Sept. 29, 1953 M. CRUMP 2,653,437
GRASS CUTTING ATTACHMENT FOR TRACTORS
Filed Nov. 2, 1951 2 Sheets-Sheet 1

INVENTOR
MURREL CRUMP,
BY
McMorrow, Berman + Davidson
ATTORNEYS

Sept. 29, 1953 M. CRUMP 2,653,437
GRASS CUTTING ATTACHMENT FOR TRACTORS
Filed Nov. 2, 1951 2 Sheets-Sheet 2
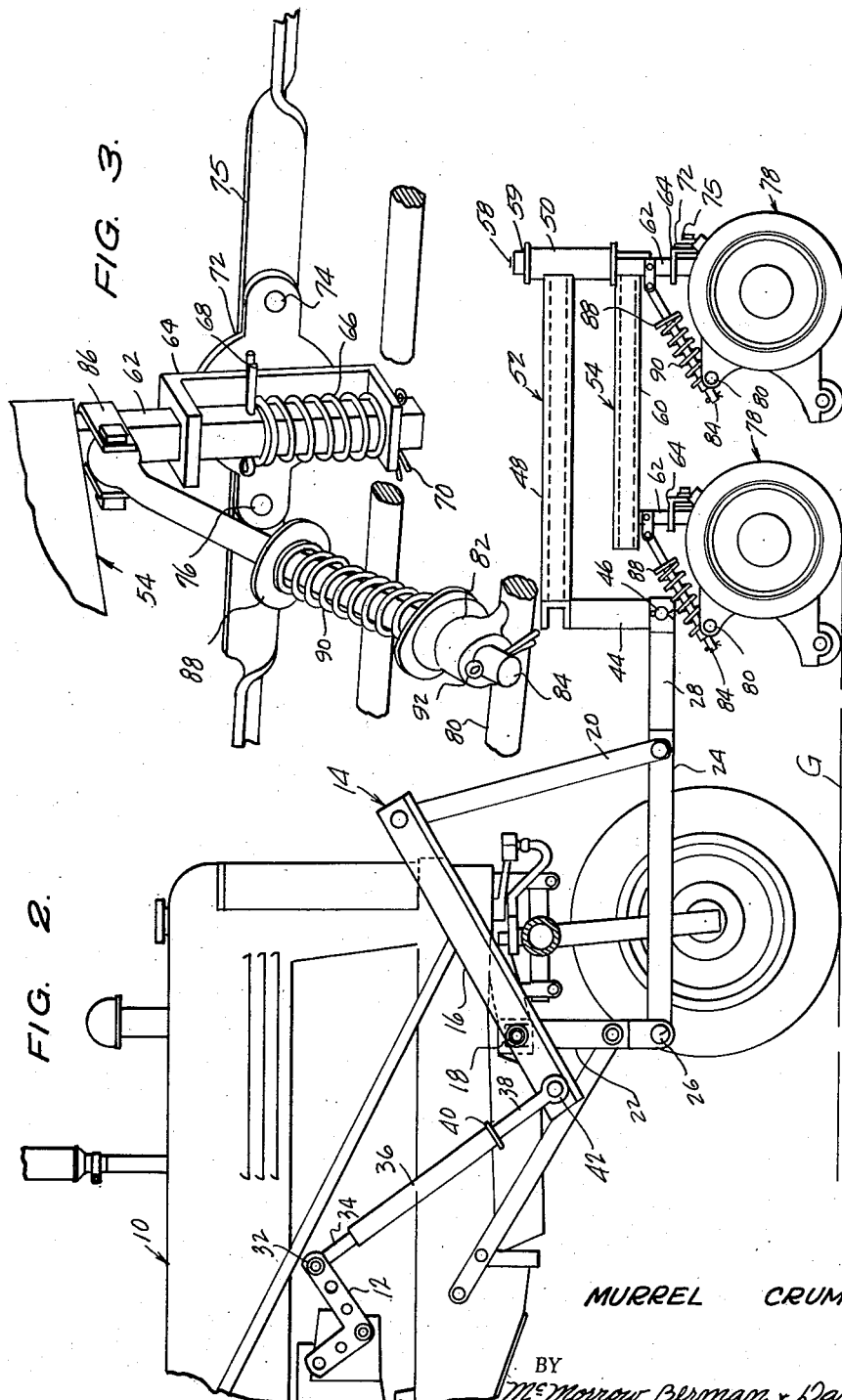
INVENTOR
MURREL CRUMP,
BY
McMorrow, Berman & Davidson
ATTORNEYS Patented Sept. 29, 1953

2,653,437

UNITED STATES PATENT OFFICE 2,653,437

GRASS CUTTING ATTACHMENT FOR TRACTORS

Murrel Crump, Olathe, Kans.

Application November 2, 1951, Serial No. 254,479

3 Claims. (Cl. 56—7)

This invention relates to tractor attachments, and more particularly, has reference to a grass cutting attachment or a mowing machine, attachable to a tractor of conventional design, and specifically adapted for mowing grassed areas of substantial size.

I propose, in carrying out one important object of the invention, to provide a mowing attachment of the general type stated that will be capable of being connected to the hydraulically controlled elevating frame of a light tractor with a high degree of facility, and which will be adapted for disconnection from the elevating frame with equal speed and ease.

Another important object is the provision of a tractor attachment which will be highly maneuverable, so that even a slight turn of the steering wheel of the tractor will be effective to turn the mower units embodied in the attachment simultaneously.

It is a further object of my invention to provide a mowing attachment which will follow faithfully the undulations of the ground, so as to assure the uniform mowing of the grass despite irregularities in ground contour.

A still further object is to provide a mowing attachment including a plurality of mower units connected to one another in a unitary assembly swiveled upon a supporting frame associated therewith in such a manner as to impart to the connected mower units castor-like operational characteristics, thus to cut a clean swathe regardless of changes of direction given the tractor during the operation of the tractor, the attachment being so arranged relative to the tractor on which it is mounted as to cause the several tractor wheels to travel only on grass previously mowed by the attachment constituting the present invention.

A still further object is to provide a mowing attachment of the type stated wherein the several mowing units, though connected in such a manner as to function as a single castor, will be independently mounted for transverse tilting movement, in a manner operative to cause each mower unit to follow ground undulations without affecting adversely the operation of any other unit.

A still further important object is to provide a mowing machine of the character stated that will be capable of manufacture at relatively low cost, considering the benefits to be obtained thereby, and which will at the same time be rugged, composed of a minimum of parts simply arranged, and efficient in operation.

Other objects will appear from the following description, the claims appended thereto, and from the annexed drawing, in which like reference characters designate like parts throughout the several views, and wherein:

Figure 2 is a side elevational view of said attachment and of the front portion of the tractor; and Figure 3 is an enlarged fragmentary perspective view with parts in section showing a portion of one of the mower units and the connection of said unit to its associated supporting frame.

Figure 1:
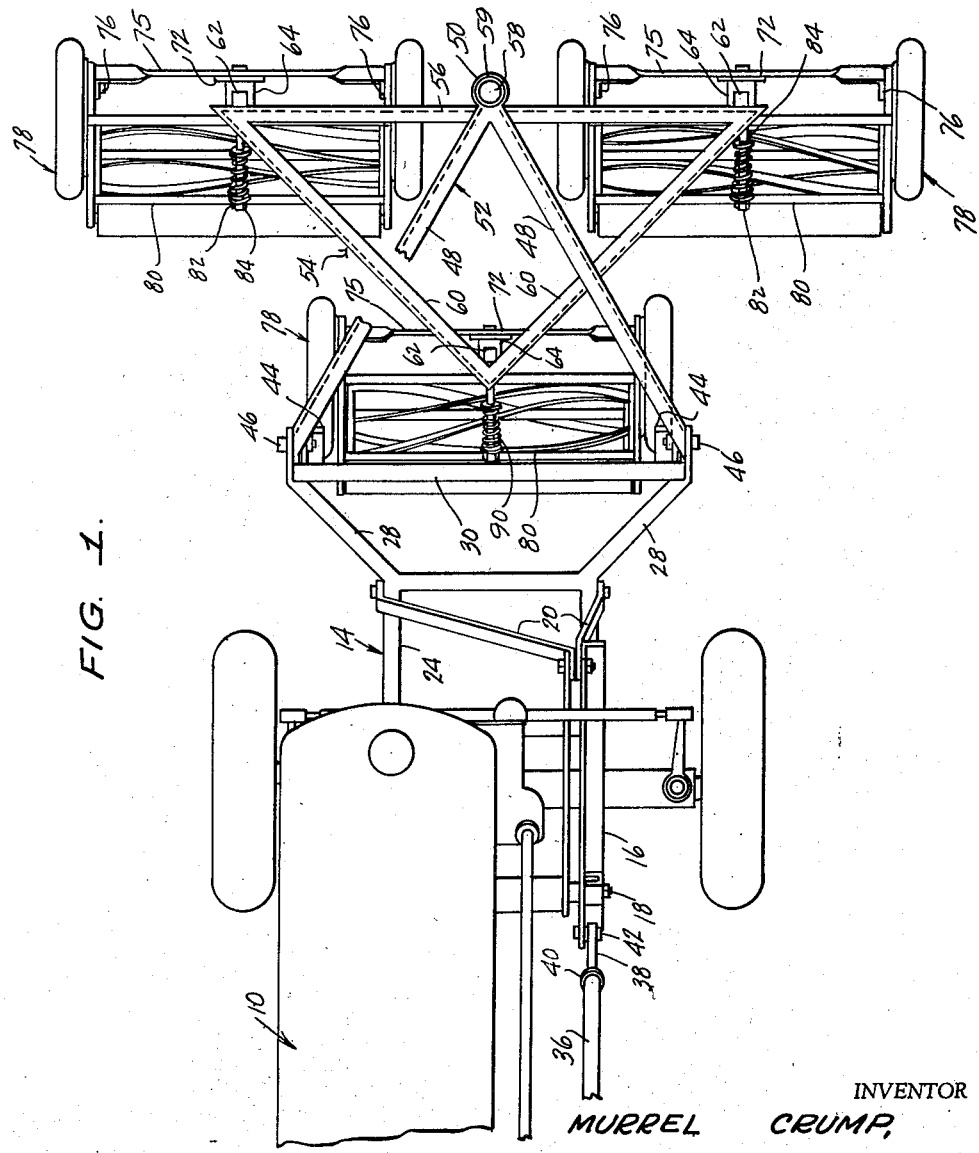
Figure 1 is a top plan view of a mower attachment formed in accordance with the present invention, a portion being broken away, a tractor on which said attachment is mounted being illustrated fragmentarily.

Referring to the drawings in detail, the reference numeral 10 generally designates a well known make of tractor, the tractor illustrated being a light tractor having a conventionally formed hydraulic lifting mechanism 12.

A conventional type of attachment for the tractor 10 is an elevating frame generally designated 14, that is raised and lowered through the medium of the hydraulic lift means 12. The frame 14, described briefly, includes a lever 16 swingable in a vertical plane about an axis 18, said lever having a pivotal connection at its front end to a depending yoke 20. A fixed bracket 22 extends downwardly from the tractor 10, and a rectangular frame portion 24 is pivotally connected at 26 to the lower end of said bracket, said frame portion being pivotally connected at its front end to the lower end of the yoke 20, and being integrally formed with forwardly diverging arms 28 between the divergent ends of which extends a cross bar 30.

The parts so far described are thoroughly conventional, and are representative of a typical elevating frame used, for example, to support a scraper blade or the like, not shown.

My invention is specifically adapted to be connected with considerable facility to a hydraulically controlled elevating frame of the type illustrated and described. In this connection, there is normally interposed between the hydraulically actuated bell crank 12 and the rear end of the lever 16 a solid rod. However, in accordance with the present invention, I substitute for this rod a telescoping connecting rod including a rod member 34 pivotally connected to the free end of the bell crank 12 and fixedly secured at its lower end to a sleeve 36, that is arranged coaxially with said rod member 34.

A lower rod member 38 telescopes in the lower end of the sleeve 36, and is slidable longitudinally of the sleeve. A stop collar 40 is fixed to the lower rod member 38, so as to limit movement of the rod member 38 inwardly of the sleeve 36.

The rod member 38 is pivotally connected at 42 to the rear end of the rockable lever 16, and it will thus be seen that on clockwise movement of the bell crank lever 12, the hydraulically controlled elevating frame will be raised, so as to lift bodily off the ground surface G the mowing attachment comprising the present invention. At the same time, however, when the moving attachment is in use, it is permitted to follow undulations in the ground surface G, by reason of the telescopic lift rod illustrated and described. The use of a telescopic lift rod further has the advantage of lessening pressure on the lifting mechanism of the tractor when the mower is in use.

The mowing attachment constituting the present invention includes a pair of upstanding arms 44 of relatively short length, adapted to be fixedly but separably connected to the opposite ends of the cross bar 30 through the medium of clevis pins 46. At their upper ends, the arms 44 are welded or otherwise rigidly secured to the divergent ends of rearwardly diverging frame members 48. As seen from Figure 1, the frame members 48 converge forwardly of the cross bar 30, and rigid with the convergent ends of said frame members is a vertical sleeve 50 depending from said convergent members, and formed open at opposite ends.

The parts 44, 48, 50 together define a rigid supporting frame for the remaining parts of the device, to be described hereinafter, said supporting frame being adapted to be fixedly but separably connected to the hydraulically controlled elevating frame of the tractor, said supporting frame being designated generally by the reference numeral 52.

A swiveled mower unit frame has been generally designated 54, and is in the shape of an isosceles triangle. The mower unit frame 54 is disposed subjacent the support frame 52, and as may be noted from Figure 1, the base leg 56 of said frame 54 is arranged transversely of the support frame 52, and is aligned vertically with the convergent ends of the frame members 48. The leg 56 may be appropriately termed the leading leg of the mower unit frame, and rigidly secured to said leg 56 medially between the opposite ends of the leg is the lower end of an upstanding spindle 58, that extends upwardly through and is rotatable in the sleeve 50. The upper end of the spindle 58 is threaded, to receive nut 59, that prevents accidental withdrawal of the post or spindle from the sleeve.

Rigid with the opposite ends of the leading leg 56 are the rearwardly converging trailing legs 60 of the mower unit frame 54, said trailing legs converging slightly in advance of the cross bar 30.

At each of the three corners of the mower unit frame 54, I fixedly attach to said frame a depending, noncircular mower unit support bar 62. The construction of this portion of the device is particularly well represented in Figure 3, wherein is illustrated in detail the means which I employ for connecting the respective mower units to the mower unit frame. On each bar 62 I mount a support bracket 64, that extends longitudinally of the bar 62, and is formed at opposite ends with lateral extensions having apertures formed complementarily to the non-circular cross sectional configuration of the bar 62. The bracket 64 is slidable longitudinally of the bar 62, and surrounding the bar intermediate the lateral extensions of the bracket is a coil spring 66. The coil spring 66 abuts at one end against the lower lateral extension of the support bracket 64, and at its upper end against a cotter key 68 carried by the bar. Another cotter key 70 is extended through the bar below the bracket.

Thus, the bracket 64 may be urged upwardly along the bar 62, against the action of the spring 66, so that the mower unit carried by the particular bracket is permitted to follow the undulations of the ground over which said mower unit is moved. As each irregularity in the contour of the ground is traversed by the mower unit, the spring 66, tending to expand, acts to shift the support bracket 64 downwardly along the bar 62, so as to retain the mower unit in intimate contact with the ground surface at all times.

Mounted upon each support bracket 64, for pivotal movement about a horizontal axis, is a disc 72, having diametrically opposite, oppositely extended ears, and extending through said ears are rivets 74 or their equivalents, which connect fixedly to the disc 72 the intermediate portion of a cross member 75. The cross member 75 is formed at opposite ends with down-turned ends 76, attached to opposite sides of a mower unit generally designated 78, of which said cross member is a component part.

By reason of this arrangement, each of the several identically formed mower units 78 is connected to the mower unit frame 54 not only for up and down movement, but also for transverse tiltable movement about a horizontal axis. In this way, a ground undulation encountered by one side of an individual mower unit is faithfully followed by said unit, the unit tilting transversely as necessary to assure a clean, uniform cutting of the grass despite said undulation. Further, each of said units is tiltable independently of the other unit, and will not affect adversely the following of the ground contour by said other unit or units.

I attach to the back bar 80 of each mower unit 78 a sleeve 82, this being fixedly secured to the back bar medially between opposite ends thereof. Slidably positioned through the sleeve 82 is a stabilizing bar 84, pivotally connected at its upper end to ears 86 rigidly secured to the bar 62 above the guide bracket 64. The stabilizing bar 84 is inclined downwardly and rearwardly from the bar 62 to the back bar 80, and extends through a coil spring 90 abutting at one end against a stop collar 88 provided upon the stabilizing bar, and abutting at its opposite end against a collar or washer engaged against the sleeve 82.

Limiting movement of the stabilizing bar relative to the sleeve 82 in one direction is a cotter key 92.

The stabilizing bar and the parts associated therewith have the function of exerting a continuous, yielding pressure against the back portion of each mower unit 78, tending to hold the ground roller of said mower unit in contact with the ground surface, despite irregularities met during the mowing operation.

At such time as the mower attachment is being transported from place to place, the hydraulic lifting mechanism 12 is operated to lift the attachment bodily from the ground surface G. In this connection, I believe it is within the spirit of the invention to provide a supplementary means for holding the mowing attachment elevated, such as a chain or the like connected at one end to the tractor frame and at its other end to the attachment constituting the present invention, thus to relieve the hydraulically controlled elevating frame of the weight of the attachment whenever desired. This, I believe, is sufficiently obvious as not to require special illustration.

When, however, the device is to be used for the purpose of mowing grass, the elevating frame 14 is lowered until the mower units 78 are in contact with the ground surface. Thereafter, the tractor 10 is operated for the purpose of cutting the grass, the reels of the several units 78 being rotated by rotation of the ground wheels of said units, this being a thoroughly conventional construction inherent in a majority of mower assemblies and constituting no part of the present invention.

It is important to note that the several mower units are so connected to each other and to the support frame 52, through the medium of the mower unit frame 54, as to swivel upon said support frame as a single castor. This result obtains by reason of the rotatable connection of the mower unit frame to the support frame along the leading edge of said mower unit frame. The arrangement is further so designed that each mower unit is connected to the mower unit frame medially between opposite sides of the mower unit, and in advance of the ground contact point at which the ground wheels of the mower unit engage the ground surface G.

A further important characteristic of the invention, in this connection, is the fact that the trailing mower unit 78 is disposed medially between the outermost portions of the leading units, and is so arranged relative to said leading units as to cut a central strip of grass after the leading units have performed their function.

While attached to the elevating frame of a tractor in the manner illustrated and described above, the mower attachment will be turned simultaneously with each turn of the steering wheel of the tractor, and this will be true whether the attachment is mounted forwardly or rearwardly of the tractor.

Should a substantial rise or undulation be encountered by the mowing attachment, the entire mowing attachment is permitted to move upwardly thereover, by reason of the telescopic lift rod, without affecting the hydraulic lift means 12.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A mower attachment for tractors comprising a generally flat support frame adapted at one end for connection to the elevating frame of a tractor; said frame embodying a pair of upstanding arms having the lower ends adapted for connection to the elevating frame of a tractor, a pair of frame members arranged in converging relation having their divergent ends fixed to the upper ends of said arms, a vertically disposed open ended sleeve fixed to the convergent ends of said frame members; a mower unit frame arranged in a plane subjacent and parallel to the plane of the support frame, said mower unit frame being formed as an isosceles triangle the base leg of which has medially thereon an upstanding spindle pivotally connected to said sleeve for swiveling of the mower unit frame about an axis normal to both frames, said mower unit frame having a pair of legs extending from the ends of the base leg in rearwardly converging relation; a plurality of identical mower units of the type including a pair of ground wheels and a rotating reel powered from said wheels underlying the several corners of the mower unit frame; and means connecting the respective units to the mower unit frame at said corners thereof for swinging movement of each unit about an axis parallel to said mower unit frame and for movement bodily toward and away from the mower unit frame, said means being effective to cause each of said units to follow ground undulations encountered thereby independently of any other of the units.

2. In a mower attachment the combination, with the hydraulic lift mechanism and the vertically swingable elevating frame of a tractor, of a telescopic lift rod interposed between said frame and lift mechanism and operative to free the elevating frame for limited swinging movement while said lift mechanism is held stationary; a generally flat support frame rigidly and separably connected at one end to the elevating frame to swing therewith; said frame embodying a pair of upstanding arms having the lower ends connected to the elevating frame, a pair of frame members arranged in converging relation having their divergent ends fixed to the upper ends of said arms, a vertical disposed open ended sleeve fixed to the convergent ends of said frame members; a mower unit frame arranged in a plane subjacent and parallel to the plane of the support frame, said mower unit frame being formed as an isosceles triangle the base leg of which has medially thereon an upstanding spindle pivotally connected to said sleeve for swiveling of the mower unit frame about an axis normal to both the support frame and said mower unit frame, said mower unit frame having a pair of legs extending from the ends of the base leg in rearwardly converging relation; a plurality of identical mower units of the type including a pair of ground engaging wheels and a rotating reel powered from said wheels underlying the several corners of the mower unit frame; and means connecting the respective units to the mower unit frame at said corners thereof for swinging movement of each unit about an axis parallel to said mower unit frame and for movement bodily toward and away from the mower unit frame, said first and second named means respectively being effective to cause said units to adapt themselves jointly and severally to ground undulations encountered thereby.

3. In a mower attachment the combination, with the hydraulic lift mechanism and the vertically swingable elevating frame of a tractor, of a telescopic lift rod interposed between said frame and lift mechanism and operative to free the elevating frame for limited swinging movement while said lift mechanism is held stationary; a generally flat support frame rigidly and separably connected at one end to the elevating frame to swing therewith; said frame embodying a pair of upstanding arms having the lower ends connected to the elevating frame, a pair of frame members arranged in converging relation having their divergent ends fixed to the upper ends of said arms, a vertical disposed open ended sleeve fixed to the convergent ends of said frame members; a mower unit frame arranged in a plane subjacent and parallel to the plane of the support frame, said mower unit frame being formed as an isosceles triangle the base leg of which has medially thereon an upstanding spindle pivotally connected to said sleeve for swiveling of the mower unit frame about an axis normal to both the support frame and said mower unit frame, said mower unit frame having a pair of legs extending from the ends of the base leg in rearwardly converging relation; a plurality of identical mower units of the type including a pair of ground engaging wheels and a rotating reel powered from said wheels underlying the several corners of the mower unit frame; means connecting the respective units to the mower unit frame at said corners thereof for swinging movement of each unit about an axis parallel to said mower unit frame and for movement bodily toward and away from the mower unit frame, said first and second named means respectively being effective to cause said units to adapt themselves jointly and severally to ground undulations encountered thereby; and spring means interposed between the respective mower units and said mower unit frame and arranged to exert a continuous, yielding pressure against the mower units tending to bias said units away from the mower unit frame and into engagement with a ground surface over which said mower units are moved.

MURREL CRUMP.

References Cited in the file of this patent

UNITED STATES PATENTS

| Number | Name | Date |
|---|---|---|
| 1,614,333 | Worthington | Jan. 11, 1927 |
| 1,771,931 | Kinney | July 29, 1930 |
| 2,099,902 | Moyer et al. | Nov. 23, 1937 |
| 2,285,306 | Roseman | June 2, 1942 |